(12) United States Patent
Winkler et al.

(10) Patent No.: US 7,761,711 B2
(45) Date of Patent: Jul. 20, 2010

(54) SIGNATURE VALIDATION AND GENERATION

(75) Inventors: Kay Hans-Peter Winkler, Darmstadt (DE); Michael Ulrich Körner, Berlin (DE); Harald Ralf Schöning, Dieburg (DE); Eckehard Hermann, Griesheim (DE); Rene Kollmorgen, Berlin (DE); Dieter Hermann Kessler, Grafenhausen (DE)

(73) Assignee: Software AG, Darmstadt (DE)

( * ) Notice: Subject to any disclaimer, the term of this patent is extended or adjusted under 35 U.S.C. 154(b) by 1216 days.

(21) Appl. No.: 10/661,350

(22) Filed: Sep. 12, 2003

(65) Prior Publication Data

US 2004/0123108 A1 Jun. 24, 2004

(30) Foreign Application Priority Data

Sep. 12, 2002 (EP) .................................. 02020471

(51) Int. Cl.
*H04L 9/00* (2006.01)
(52) U.S. Cl. ..................................................... 713/176
(58) Field of Classification Search .................. 713/176
See application file for complete search history.

(56) References Cited

U.S. PATENT DOCUMENTS 6,643,650 B1 * 11/2003 Slaughter et al. .............. 707/10

2004/0015316 A1 * 1/2004 Sarfati et al. ................. 702/122

FOREIGN PATENT DOCUMENTS

WO WO01/13574 2/2001
WO WO/0120513 3/2001

OTHER PUBLICATIONS

European Search Report mailed Feb. 18, 2003, European Application No. 02020471.5.

* cited by examiner

*Primary Examiner*—Gilberto Barron, Jr.
*Assistant Examiner*—Devin Almeida
(74) *Attorney, Agent, or Firm*—Meyertons Hood Kivlin Kowert & Goetzel, P.C.; Jeffrey C. Hood

(57) ABSTRACT

Methods and apparatuses for validating a message with a signature. The method may include receiving the message with the signature and carrying out an integrated validation and storing process. The signature may be validated based on a validation algorithm and a key. The received message may be stored in a database. A method for generating a signature for a message may include carrying out an integrated receiving and generating process. The message to be sent may be received and the signature may be generated based on a signing algorithm and a key. The message may be sent with the signature.

28 Claims, 5 Drawing Sheets

SIGNATURE VALIDATION AND GENERATION

BACKGROUND OF THE INVENTION

1. Field of the Invention

The present invention generally relates to validating electronic messages. More particularly, the present invention relates to methods and apparatuses for generating and validating messages with digital signatures.

2. Description of the Related Art

If a message is sent via an untrustworthy channel, like the Internet, the content of the message and the name of the sender may be changed by not authorized persons. But the content of the message should only be stored at the receiver, when the receiver is sure about the correct sender.

SUMMARY OF THE INVENTION

In various embodiments, electronically signed messages may give the receiver the guarantee that the received message comes from the alleged person and that the message has not been changed during the transmission. The signature may be information attached to the message, which is based on the content of the message and the key of the signer, for example the sender. A message can, for example, be signed by a value, which is the result of a common algorithm with the sender's private key over the content (or a hash) of the message. If the receiver knows the common algorithm and the public key of the sender, the receiver may apply the algorithm to the received message and compare the result with the submitted value. In some embodiments, if the values match, the complete message originally has been sent by the owner of the key.

In various embodiments, the generation of the signature may be carried out by a security device, which receives the content of the message in a first step, applies the algorithm with the sender's private key on the content to generate the signature and forwards the message with the signature to the receiver. The receiver may include also a security device for the validation of the signature. In some embodiments, if the signature is valid, the security device may forward the message for further proceedings, e.g. to store the message in a database, otherwise the message may be rejected.

This method may have the drawback, that the content of the message may be modified between the creation of the message and the generation of the signature by the sender as well as between the validation of the signature and the further proceeding by the receiver.

Therefore, a method and an apparatus for generating or validating a signature may be provided, which is securer against attacks from non-authorized persons without complicating the method and the apparatus.

In various embodiments, a method for validating a message with a signature may include receiving the message with the signature and carrying out an integrated validation and storing process. In some embodiments, the method may further include validating the signature based on a validation algorithm and a key. In some embodiments, the received message may be stored in a database.

In various embodiments, a received message may be handled in at least two steps. One step may be a receiving step and the other step may be an integrated step. In some embodiments, the integrated step may include combining two processes, namely the validation of the signature and the processing of the message.

In various embodiments, messages may be an accumulation of information. A message can be, for example, a document or a contract. That means the message may be a complete business contract with information about the sender and the receiver or just the content. In some embodiments, the message may be an Extensible Markup Language (XML) document. XML is a universal format for structured documents and data on the Web. The term message can include the signature. In some embodiments, the signature can also be transmitted without the signed document. In this case the term message is used for the signature alone.

In some embodiments, the message may be verified by validating the signature of the message. This signature may be a cryptographic means through which the origin of a document and the identity of the sender may be verified. In addition, the signature verifies, that the message has not been changed since the message has been signed by the holder of the signature's private key. The signature may be a piece of information based on the document to be signed, a signature algorithm and on a key of the sender. An example for a signature algorithm is the Digital Security Algorithm (DSA) over a hash function.

In some embodiments, asymmetric keys with a public and a private key are used. The generator of the signature uses his private key and the receiver of the signature uses the public key to verify the sender.

In some embodiments, the integrated process of validating the signature and storing the message may enable, for the first time, that the message cannot be changed between the signature validation and the storing. In some embodiments, only in the case where the signature of the message is valid, this integrated process causes a processable version of the message. Otherwise the message may not enter an area in which validated messages will be processed.

One example to carry out this integrated process is to store the message and to validate the signature within one atomic process. In some embodiments, only in the case that the signature can be validated the storing of the message is completed and the transaction is committed. Otherwise the storing process may be rolled back, that means all data, which has already been stored, may be deleted. Alternatively, the data of not validated messages may be stored in an insecure area. If the receiver has used the wrong key for the validation, there is no need to submit the complete message again. The receiver may retrieve the message from the insecure area and carry out the integrated validation and storing process again.

In some embodiments, the received message may be locked before the integrated validation and the storing step is initiated, and until this integrated step is finished. In some embodiments, this may mean that nobody can change anything within the message to be validated during the integrated process and manipulate the result.

In various embodiments, the integrated process may be carried out in one device and this may be the device in which the received message is processed. In the present example the message may be stored in a storage device and the method may be carried out by the storage device. This realization has the advantage that the complete validation and storing process may be controlled by one person, for example by the administrator of the storage device.

In some embodiments, the signature is a digital signature. This digital signature may be an XML signature. XML signatures may be applied to any digital content of one or more resources. Different kinds of XML signatures may be known in the art. For example, an enveloped signature may be generated based on message data within the same XML document and a detached signature may be generated based on external data. The different kinds of XML signatures are described in the W3C specification (http://www.w3.org/TR/xmldsig-core/).

In some embodiments, the integrated validation and storing process may be carried out as an ACID (Atomic, Consistent, Isolation and Durable) transaction. This transaction may provide a simple model of success or failure. In some embodiments, either the transaction is committed (that means all actions are carried out), or the transactions aborts (that means no action is carried out or all carried out actions are revoked).

The term atomic means that the transaction cannot be divided into smaller parts. The transaction can either be carried out complete or not at all. Consistency in the scope of an ACID transaction defines the transformation of data from one consistent state into another consistent state. Each transaction is isolated, which means, that other transactions, which access the same resources have to be carried out before or after the current transaction is finished. The result of a transaction is durable. ACID transactions are described, for example, in "Transaction processing: Concepts and Techniques" by Jim Gray and Andreas Reuter.

In some embodiments, a method for generating a signature for a message that is the result of a database access may be provided. The method may include carrying out an integrated receiving and generating process, where a message to be sent is received, in other words prepared, and a signature may be generated based on a signing algorithm and a key and the step of sending the message with the signature.

In some embodiments, a message to be sent may be handled in at least two steps. One step is an integrated step, where two tasks are combined in one process, namely the processing of the message and the generating of the digital signature. In the second step the message may be sent.

In some embodiments, a signature may be generated. This signature may be a cryptographic means through which the authenticity of a document and the identity of the signer may be verified. The signature may be a piece of information based on the document to be signed, a signature algorithm and on a key of the sender.

The integrated process of receiving the message to be sent and generating the signature may guarantee that at no point of time the message can be changed. In some embodiments, the message may be locked against access before the integrated step is initiated and until the integrated step is finished.

In some embodiments, as already described in connection with the integrated validation and storing process, all tasks may be carried out in one transaction. This method may guarantee that either both parts of the integrated process succeed or both fail.

In some embodiments, a method for validating a message with a signature, where the method includes receiving the message with the signature, starting an ACID transaction, sending a request to a security device, validating the signature in the security device, storing of the message in response to the result of the validation and committing the ACID transaction.

In some embodiments, generating a signature for a message, where the method includes starting an ACID transaction, acquiring the message to be signed, sending a request to a security device, generating a signature for the message in the security device, committing the ACID transaction and sending the message with the signature may be provided.

In various embodiments, an apparatus for validating a message with a signature, where the apparatus includes means for receiving the message with the signature, and means for carrying out an integrated validation and storing process, where the means are capable and affected to validate the signature based on a validation algorithm and a key and to store the message may be provided.

In some embodiments, an apparatus for generating a signature for a message, where the apparatus includes means for carrying out an integrated receiving and generating process, where the means are capable and affected to receive the message to be sent and to generate the signature based on a signing algorithm and a key, and means for sending the message with the signature may be provided.

BRIEF DESCRIPTION OF THE DRAWINGS

A better understanding of the present invention may be obtained when the following detailed description is considered in conjunction with the following drawings, in which.

Figure 1:
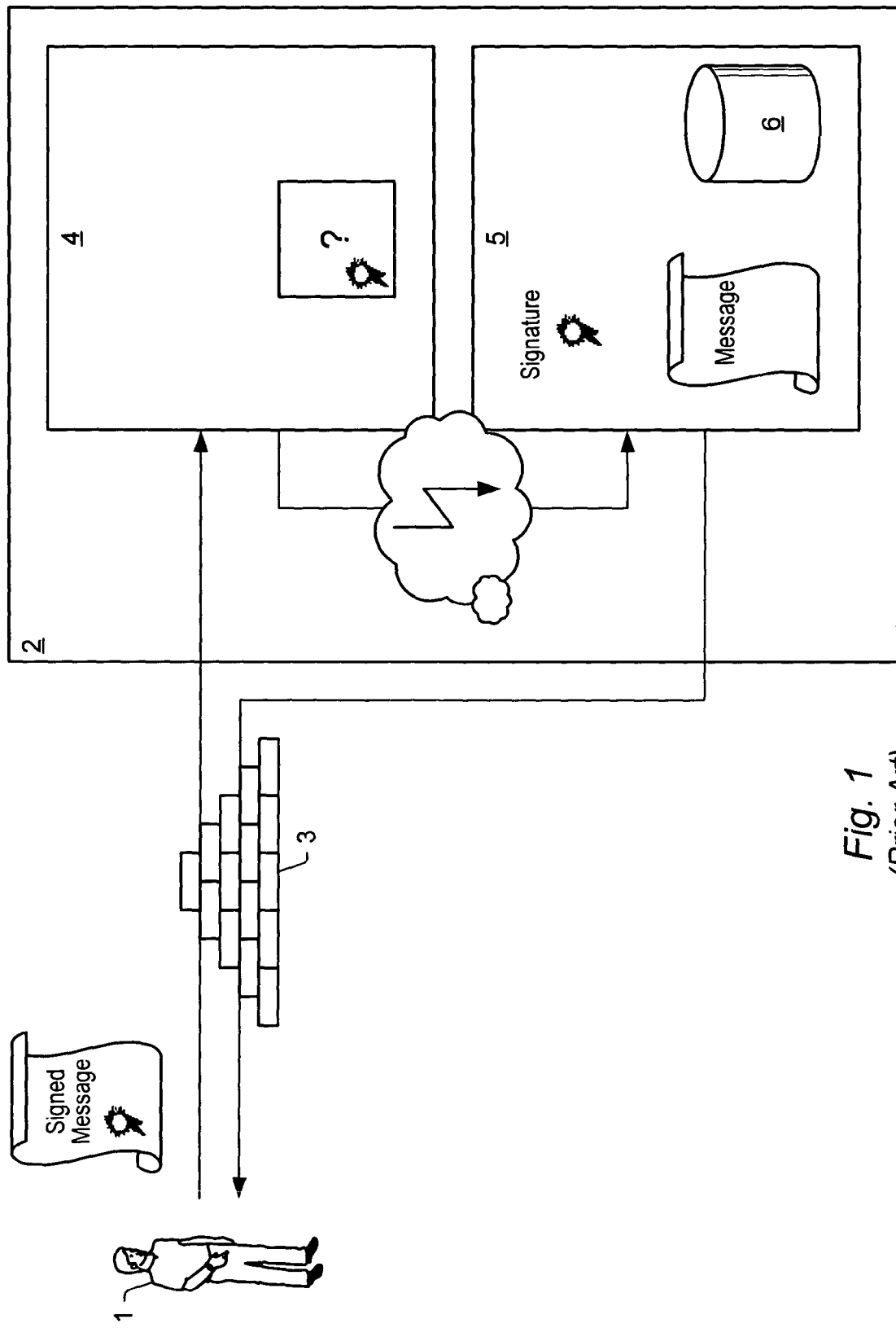
FIG. 1 illustrates a flowchart representing a validation and storing process according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE DRAWINGS

Some embodiments may include an archive device. This archive device may include a database where messages, for example XML-documents, can be stored and retrieved from an external user. The user may have access to the archive device via a data network, for example the Internet.

FIG. 1 shows the validation and storing process of a message according to the prior art. A client 1 sends a digitally signed message to a receiving device, in this example the archive device 2. The message passes the firewall 3 and arrives at the security device 4 of the archive device 2. At this security device 4 the signature of the message is validated.

If the validation succeeds, the message, which is now a trusted message, is forwarded to a storage device 5 in the archive device 2. The storage device 5 receives the trusted message and stores the trusted message in a database 6. In the present example, the validated signature is also forwarded to the storage device 5 and stored in the database 6. Now, the storage device 5 can confirm the successful reception of the trusted message to the client 1.

In a prior art system as described in FIG. 1 the trusted message could be modified or replaced between the security device 4 and the storage device 5 by a not legitimated person. This enables the not legitimated person to store any trustless message in the database 6 of the storage device 5.

Figure 2:
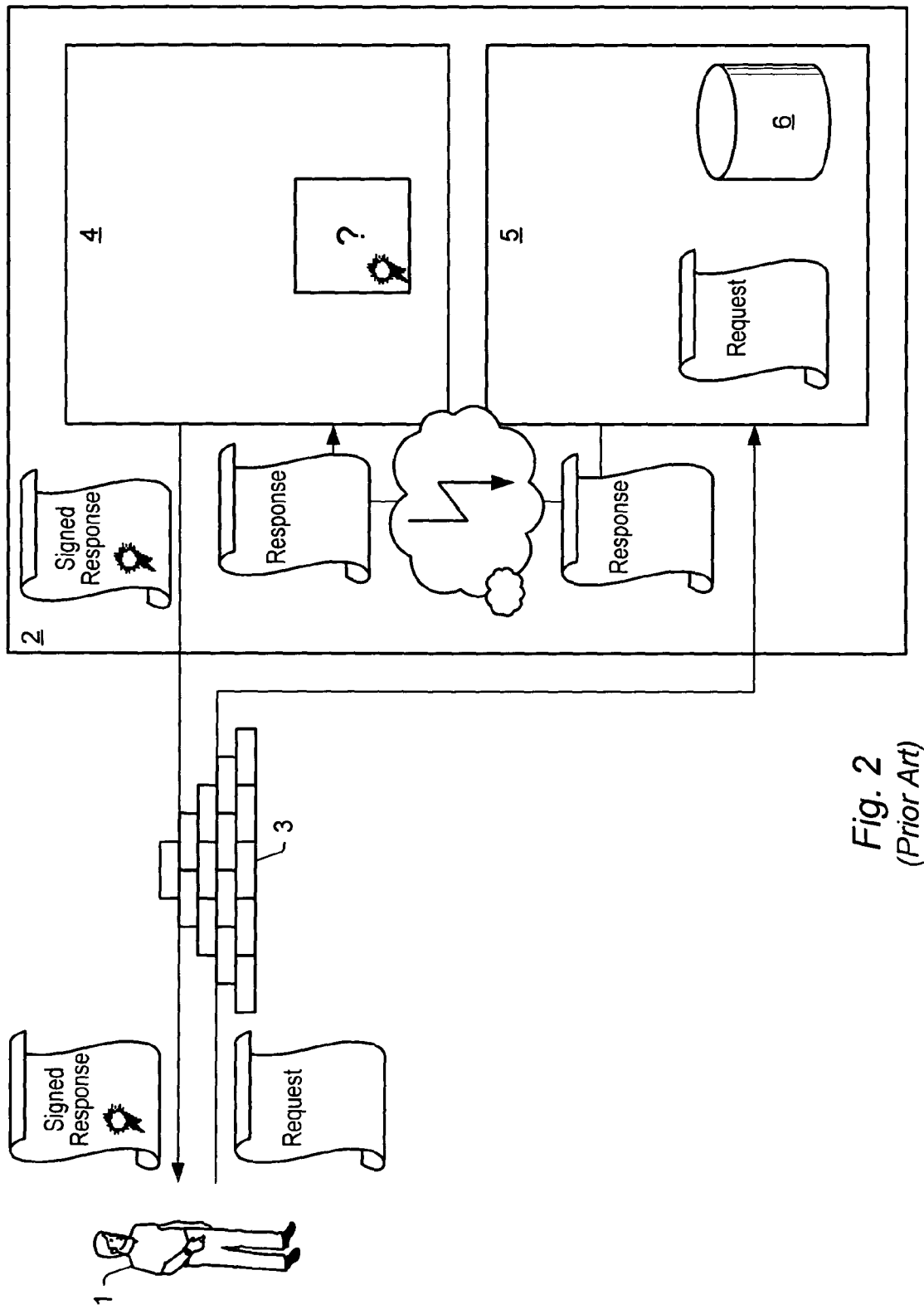
FIG. 2 illustrates a flowchart representing a receiving and generating process according to the prior art.

The same problem occurs, when a receiving and generating process is carried out by an archive device 2 according to the prior art. FIG. 2 shows such a process. The client 1 sends a request for a message to the storage device 5 in the archive device 2. This request passes the firewall 3. In the storage device 5 the requested message is received from the database 6 and forwarded to the security device 4. In the security device 4 the message is signed and the message is sent together with the signature via the firewall 3 to the client 1.

Again, a not legitimated person could modify or replace the message, i.e. the response between the storage device 5 and the security device 4.

Figure 3:
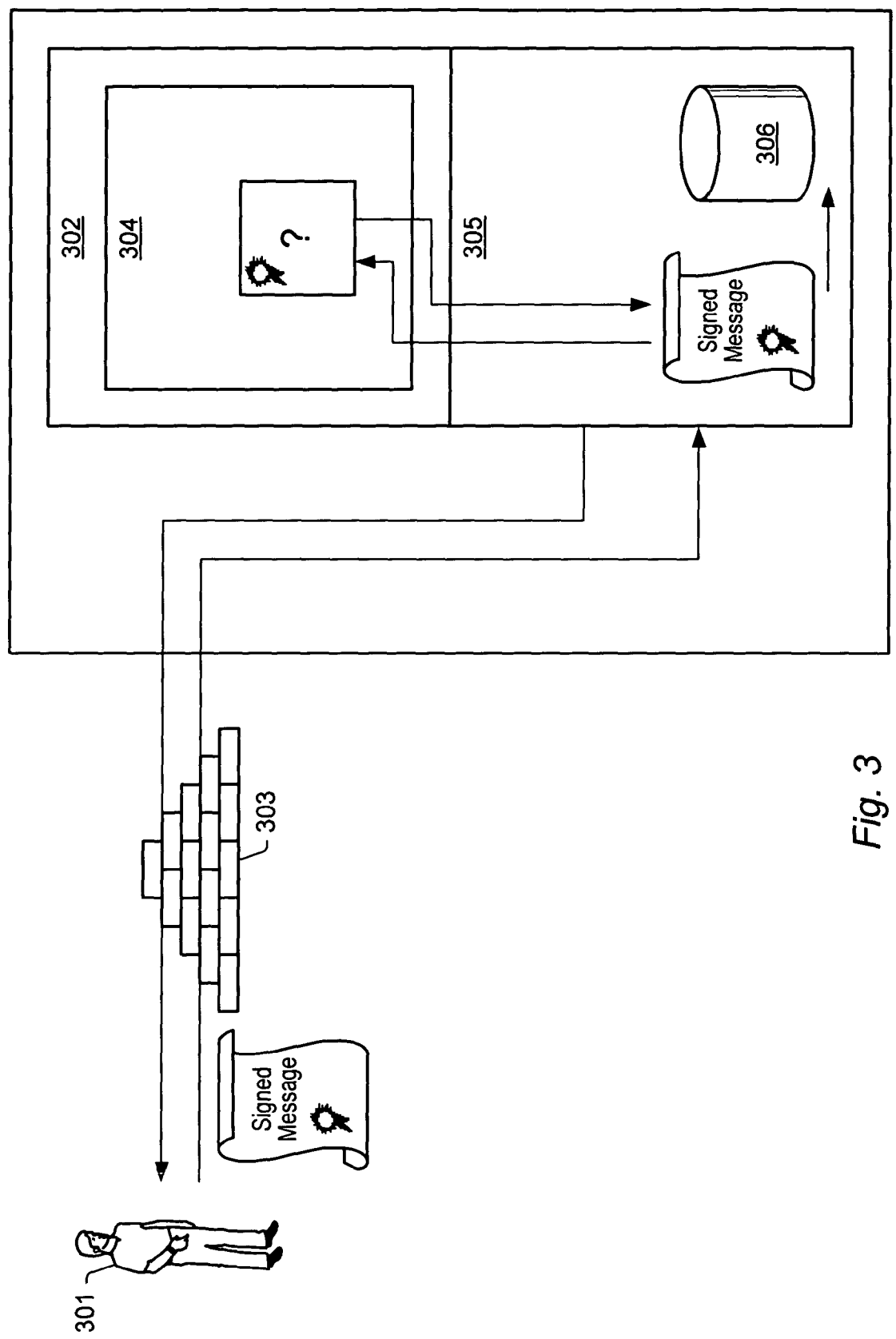
FIG. 3 illustrates a flowchart representing an integrated validation and storing process according to an embodiment.

FIG. 3 shows an embodiment of how this problem may be solved. In some embodiments, when the client 1 sends a signed message (possibly through a firewall 3) to the archive device 302, the signed message may be received by the storage device 305. In some embodiments, the security device 304 may not be capable of receiving messages. The storage device 305 may start an ACID transaction. Within the ACID transaction the received message and the received signature may be locked. That means that no parallel updates of the message or the signature may be allowed while the transaction is running. This achieves, that no other action with the message, the signature or the key is possible as long as integrated validation and storing process is not finished.

In various embodiments, after the transaction has been started, the integrated validation and storing process may be initiated. One part of this integrated process—namely the validation—may be carried out, in the present example, in the security device 304 of the archive device 302 and the other part—namely the storing—may be carried out in the storage device 305 of the archive device 302. But these two parts may be processed within the same transaction, so that an independent modification of one part is not possible.

If the validation succeeds and the verified message has been stored the transaction is committed (and the locks are released), the stored message may now be protected by the security of the storage device 305. If the signature validation fails, the storage process may be stopped and rolled back and the message may be rejected or stored in another area.

Figure 4:
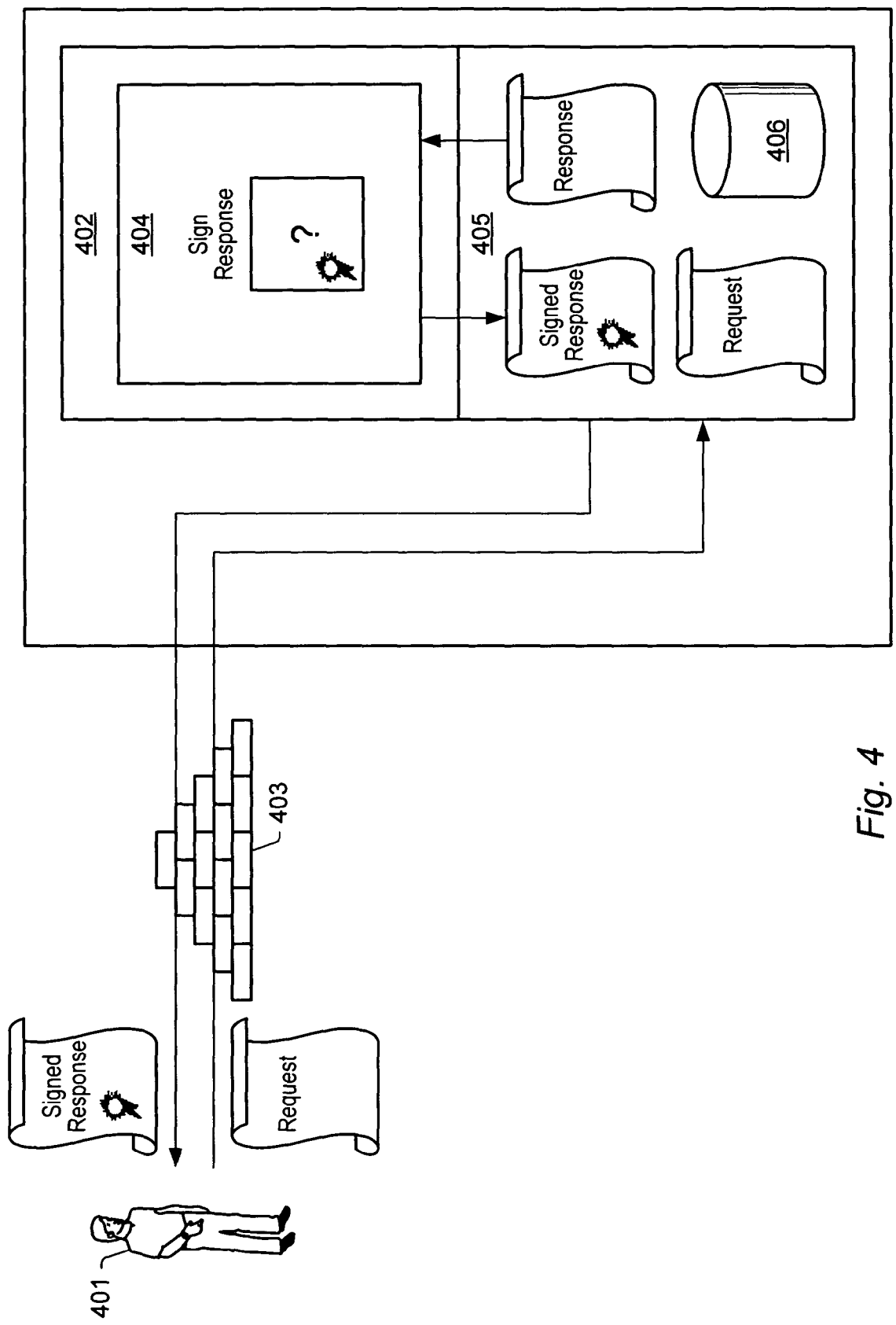
FIG. 4 illustrates a flowchart representing an integrated receiving and generating process according to an embodiment.

An embodiment of a corresponding method for sending a signed message is illustrated in FIG. 4. The client 401 may send a request for a message to the archive device 402. The request may be received by the storage device 405 of the archive device 402. In response to the request, the storage device 405 may initiate, that it receives the requested message, for example, from the database 406. In some embodiments, the receiving may be carried out by the storage device 405 in one ACID transaction as an integrated receiving and generating process. The signature may be generated in the security device 404. After the message has been received and signed the signed message may be sent to the client 401.

Figure 5:
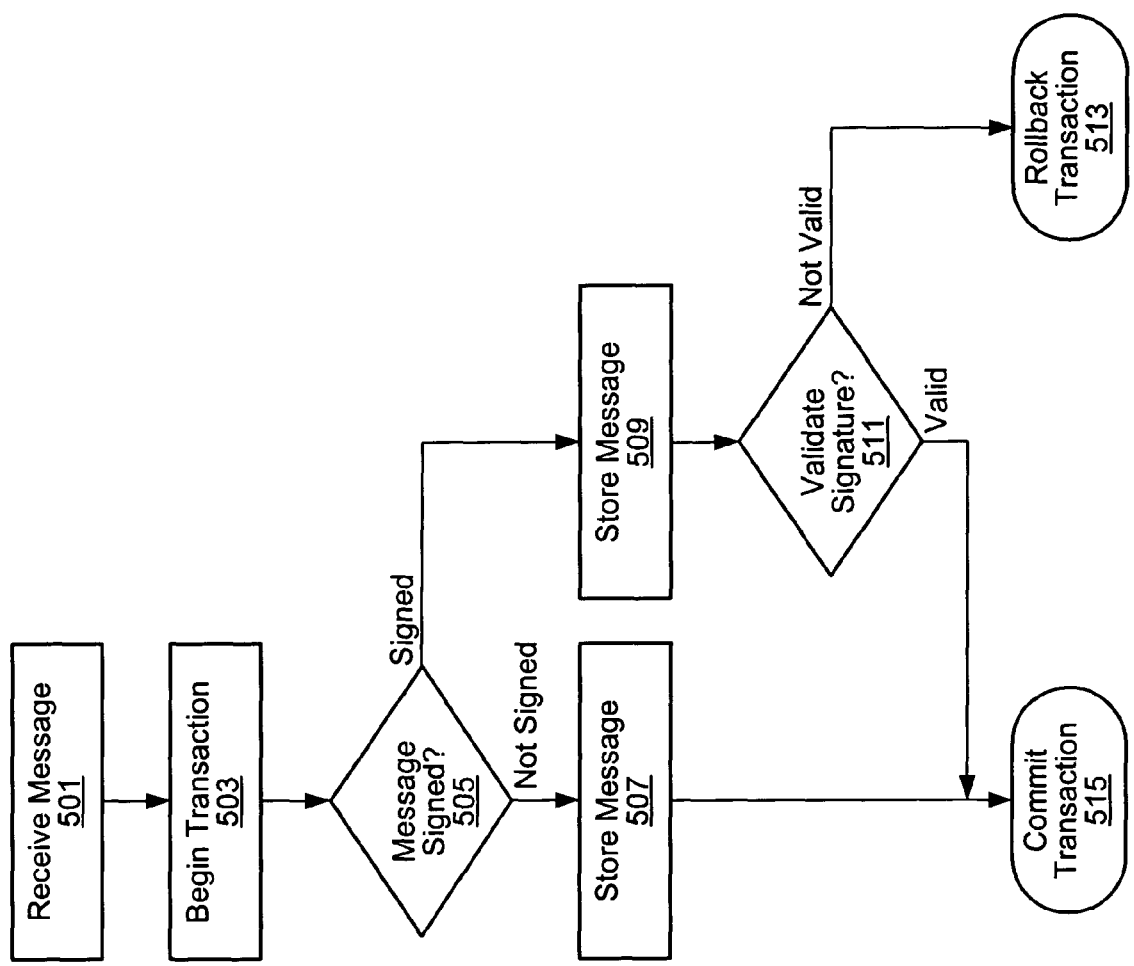
FIG. 5 illustrates a flowchart representing a validation process, according to an embodiment.

An embodiment of the process of validation is described in more detail in connection with FIG. 5. FIG. 5 shows an embodiment of a flowchart illustrating the different steps during the validation process. Before the validation process is carried out, the message, in the present example an XML document, may, at 501, be received. Then, at 503, a transaction may be started and it is checked, at 505 if the document is signed or not. In some embodiments, if the message is not signed, the message, at 507, may be stored and the transaction, at 515, may be committed.

In some embodiments, if the message is signed, the message, at 509, may be stored and the document may be preprocessed into a normalized form according to canonicalization rules. In the present example, the signature may include two parts. One part may include references to the signed documents, nodes, or subnodes, the transform algorithms, which identify the signed parts of the documents and a hash value over the data of the referenced part. The second part of the signature may be a hash value over the complete first part of the signature, which may be ciphered by the private key of the signer.

In various embodiments, in order to validate the first part of the signature, the signed parts of the documents may be identified based on the references, the transform algorithms may be applied and a hash value is calculated over these parts. If this calculated hash value corresponds to the first hash value in the part of the signature, this part of the validation process was successful.

In some embodiments, the ciphered second hash value in the second part of the signature may be employed to ensure, that the first hash value has not been modified. For this, a hash value may be calculated over the first part of the signature and compared with the second hash value, deciphered with the public key of the signer.

If both parts of the validation process have been successful, the signature is valid and the transaction, at 515, is committed. Otherwise, the signature is not valid and the complete transaction, at 513, is rolled back.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for validating a message with a signature, wherein said method comprises:
   receiving said message with said signature; and
   carrying out an integrated validation and storing process, wherein said signature is validated based on a validation algorithm and a key and said received message is stored in a database, and wherein said carrying out the integrated validation and storing process comprises storing said message and validating said signature within one atomic process;
   wherein said storing said message and validating said signature within one atomic process prevents possible modification of the message between validation and storage, and wherein said received message is locked before the integrated validation and storing process is carried out and released after the integrated validation and storing process has been finished.

2. The method according to claim 1, wherein the storing process is rolled back, if the signature is not valid.

3. The method according to claim 1, wherein the storing process is completed, if the signature is valid.

4. The method according to claim 1, wherein said received signature is locked before the integrated validation and storing process is carried out and released after the integrated validation and storing process has been finished.

5. The method according to claim 1, wherein the integrated validation and storing process is carried out by said database.

6. The method according to claim 5, wherein the integrated validation and storing process is controlled by said database.

7. The method according to claim 1, wherein said message is an XML-document.

8. The method according to claim 1, wherein said signature is a digital signature.

9. The method according to claim 1, wherein said integrated validation and storing process is carried out as an ACID transaction.

10. A method for generating a signature for a message, wherein said method comprises:

carrying out an integrated receiving and generating process, wherein said message to be sent is received and said signature is generated based on a signing algorithm and a key, wherein said carrying out the integrated receiving and generating process comprises receiving said message to be sent and generating said signature within one atomic process, wherein said receiving said message and said generating said signature within one atomic process prevents possible modification of the message between said receiving and said generating, and wherein said message to be sent is locked before the integrated receiving and generating process is carried out and released after the integrated receiving and generating process has been finished; and sending said message with said signature.

11. The method according to claim 10, wherein said key to be used for generating the signature is locked before the integrated receiving and generating process is carried out and released after the integrated receiving and generating process has been finished.

12. The method according to claim 10, wherein said message is an XML-document.

13. The method according to claim 10, wherein said integrated receiving and generating process is carried out as an ACID transaction.

14. The method according to claim 10, wherein said integrated receiving and generation process is carried out in a database, where said message to be sent is stored.

15. The method according to claim 10, wherein said signature is a digital signature.

16. An apparatus for validating a message with a signature, wherein said apparatus comprises:

a first means for receiving said message with said signature; and a second means for carrying out an integrated validation and storing process, wherein said second means are capable and affected to validate said signature based on a validation algorithm and a key and to store said message, wherein said carrying out the integrated validation and storing process comprises storing said message and validating said signature within one atomic process, wherein said storing said message and validating said signature within one atomic process prevents possible modification of the message between validation and storage, and wherein said received message is locked before the integrated validation and storing process is carried out and released after the integrated validation and storing process has been finished.

17. An apparatus for generating a signature for a message, wherein said apparatus comprises:

means for carrying out an integrated receiving and generating process, wherein said means are capable and affected to receive said message to be sent and to generate said signature based on a signing algorithm and a key, wherein said carrying out the integrated receiving and generating process comprises receiving said message to be sent and generating said signature within one atomic process, wherein said receiving said message and said generating said signature within one atomic process prevents possible modification of the message between said receiving and said generating, wherein said message to be sent is locked before the integrated receiving and generating process is carried out and released after the integrated receiving and generating process has been finished; and means for sending said message with said signature.

18. A method for validating a message with a signature, wherein said method comprises:

receiving said message with said signature; and carrying out an integrated validation and storing process, wherein said signature is validated based on a validation algorithm and a key and said received message is stored in a database, wherein said integrated validation and storing process prevents possible modification of the message between validation and storage, and wherein said received message is locked before the integrated validation and storing process is carried out and released after the integrated validation and storing process has been finished.

19. The method according to claim 18, wherein the storing process is rolled back, if the signature is not valid.

20. The method according to claim 18, wherein said received signature is locked before the integrated validation and storing process is carried out and released after the integrated validation and storing process has been finished.

21. A method for generating a signature for a message, wherein said method comprises:

carrying out an integrated receiving and generating process, wherein said message to be sent is received and said signature is generated based on a signing algorithm and a key, wherein said carrying out the integrated receiving and generating process prevents possible modification of the message between said receiving and said generating, and wherein said message to be sent is locked before the integrated receiving and generating process is carried out and released after the integrated receiving and generating process has been finished; and sending said message with said signature.

22. The method according to claim 21, wherein said key to be used for generating the signature is locked before the integrated receiving and generating process is carried out and released after the integrated receiving and generating process has been finished.

23. A method for validating a message with a signature, wherein said method comprises:

receiving said message with said signature; and carrying out an integrated validation and storing process, wherein said signature is validated based on a validation algorithm and a key and said received message is stored in a database, and wherein said carrying out the integrated validation and storing process comprises storing said message and validating said signature within one atomic process;

wherein said storing said message and validating said signature within one atomic process prevents possible modification of the message between validation and storage, and wherein said received signature is locked before the integrated validation and storing process is carried out and released after the integrated validation and storing process has been finished.

24. A method for generating a signature for a message, wherein said method comprises:

carrying out an integrated receiving and generating process, wherein said message to be sent is received and said signature is generated based on a signing algorithm and a key, wherein said carrying out the integrated receiving and generating process comprises receiving said message to be sent and generating said signature within one atomic process, wherein said receiving said message and said generating said signature within one atomic process prevents possible modification of the message between said receiving and said generating, and wherein said key to be used for generating the signature is locked before the integrated receiving and generating process is carried out and released after the integrated receiving and generating process has been finished; and sending said message with said signature.

25. An apparatus for validating a message with a signature, wherein said apparatus comprises:

a first means for receiving said message with said signature; and a second means for carrying out an integrated validation and storing process, wherein said second means are capable and affected to validate said signature based on a validation algorithm and a key and to store said message, wherein said carrying out the integrated validation and storing process comprises storing said message and validating said signature within one atomic process, wherein said storing said message and validating said signature within one atomic process prevents possible modification of the message between validation and storage, and wherein said received signature is locked before the integrated validation and storing process is carried out and released after the integrated validation and storing process has been finished.

26. An apparatus for generating a signature for a message, wherein said apparatus comprises:

means for carrying out an integrated receiving and generating process, wherein said means are capable and affected to receive said message to be sent and to generate said signature based on a signing algorithm and a key, wherein said carrying out the integrated receiving and generating process comprises receiving said message to be sent and generating said signature within one atomic process, wherein said receiving said message and said generating said signature within one atomic process prevents possible modification of the message between said receiving and said generating, wherein said key to be used for generating the signature is locked before the integrated receiving and generating process is carried out and released after the integrated receiving and generating process has been finished; and means for sending said message with said signature.

27. A method for validating a message with a signature, wherein said method comprises:

receiving said message with said signature; and carrying out an integrated validation and storing process, wherein said signature is validated based on a validation algorithm and a key and said received message is stored in a database, wherein said integrated validation and storing process prevents possible modification of the message between validation and storage, and wherein said received signature is locked before the integrated validation and storing process is carried out and released after the integrated validation and storing process has been finished.

28. A method for generating a signature for a message, wherein said method comprises:

carrying out an integrated receiving and generating process, wherein said message to be sent is received and said signature is generated based on a signing algorithm and a key, wherein said carrying out the integrated receiving and generating process prevents possible modification of the message between said receiving and said generating, and wherein said key to be used for generating the signature is locked before the integrated receiving and generating process is carried out and released after the integrated receiving and generating process has been finished; and sending said message with said signature.

* * * * *